(12) United States Patent
Pagter et al.

(10) Patent No.: US 12,423,684 B2
(45) Date of Patent: Sep. 23, 2025

(54) DIGITAL SIGNATURE GENERATION USING A COLD WALLET

(71) Applicant: Blockdaemon ApS, Aarhus C (DK)

(72) Inventors: Jakob Illeborg Pagter, Aarhus V (DK); Thomas Pelle Jakobsen, Marslet (DK)

(73) Assignee: BLOCKDAEMON APS, Aarhus (DK)

( * ) Notice: Subject to any disclaimer, the term of this patent is extended or adjusted under 35 U.S.C. 154(b) by 109 days.

(21) Appl. No.: 17/764,814

(22) PCT Filed: Oct. 6, 2020

(86) PCT No.: PCT/EP2020/077977
§ 371 (c)(1),
(2) Date: Mar. 29, 2022

(87) PCT Pub. No.: WO2021/073953
PCT Pub. Date: Apr. 22, 2021

(65) Prior Publication Data
US 2022/0327530 A1 Oct. 13, 2022

(30) Foreign Application Priority Data

Oct. 15, 2019 (EP) ..................................... 19203273
Jan. 10, 2020 (EP) ..................................... 20151197

(51) Int. Cl.
*G06Q 20/38* (2012.01)
*G06Q 20/36* (2012.01)
(52) U.S. Cl.
CPC ..... *G06Q 20/3825* (2013.01); *G06Q 20/3674* (2013.01); *G06Q 20/3829* (2013.01); *G06Q 2220/00* (2013.01)

(58) Field of Classification Search
CPC ........... G06Q 20/3825; G06Q 20/3674; G06Q 20/3829; G06Q 2220/00; H04L 2209/56;
(Continued)

(56) References Cited

U.S. PATENT DOCUMENTS 10,540,654 B1 * 1/2020 James ................... G06Q 20/223
10,903,991 B1 * 1/2021 Craige .................... H04L 9/085
(Continued)

FOREIGN PATENT DOCUMENTS

CN 104320253 A 1/2015
CN 107733648 A 2/2018
(Continued)

OTHER PUBLICATIONS

Japanese Office Action from Corresponding Japanese Patent Application No. JP2022-520338, Jul. 30, 2024.
(Continued)

*Primary Examiner* — Zeshan Qayyum

(57) ABSTRACT

A method and a system for providing a digital signature are disclosed. A private signature key is distributed among two or more nodes of a cold wallet. Each node of the cold wallet generates a pre-signature, based on its share(s) of the private signature key, and transmits the pre-signature to one of two or more pre-signature nodes. A signing application requests a signature and transmits a message to be signed to each of the pre-signature nodes. In response to receiving the request for a signature and the message to be signed, each pre-signature node generates a partial signature, based on its pre-signature and on the message to be signed. Each pre-signature node transmits its partial signature to the signing application, and the signing application computes a digital signature from the partial signatures.

16 Claims, 2 Drawing Sheets

(58) Field of Classification Search
CPC ....... H04L 9/3239; H04L 9/3247; H04L 9/50; H04L 9/085; H04L 9/0825
USPC .......................................................... 705/67
See application file for complete search history.

(56) References Cited

U.S. PATENT DOCUMENTS

| | | | |
|---|---|---|---|
| 12,271,898 B1* | 4/2025 | Arvanaghi | G06Q 20/10 |
| 2008/0095360 A1* | 4/2008 | Vuillaume | H04L 9/3236 713/180 |
| 2008/0181413 A1* | 7/2008 | Yi | H04L 9/302 380/279 |
| 2019/0280864 A1 | 9/2019 | Cheng et al. | |
| 2019/0378119 A1 | 12/2019 | Hyuga et al. | |
| 2020/0252382 A1* | 8/2020 | Peddada, IV | H04L 9/3271 |
| 2020/0344070 A1* | 10/2020 | Li | H04L 9/3247 |
| 2020/0356989 A1* | 11/2020 | Shamai | H04L 9/0833 |
| 2021/0083872 A1* | 3/2021 | Desmarais | H04L 9/3239 |
| 2021/0083882 A1* | 3/2021 | Venable, Sr. | H04L 9/3268 |
| 2021/0099294 A1* | 4/2021 | Guo | G06Q 20/401 |

FOREIGN PATENT DOCUMENTS

| | | | |
|---|---|---|---|
| CN | 109257179 A | 1/2019 | |
| WO | 2019043466 A1 | 3/2019 | |
| WO | 2019159172 A1 | 8/2019 | |
| WO | 2019193452 A1 | 10/2019 | |

OTHER PUBLICATIONS

Goldfeder et al., "Securing Bitcoin Wallets Via Threshold Signatures," Jun. 3, 2014, 11 Pages, retrieved from the Internet at https://www.cs.princeton.edu/~stevenag/bitcoin_threshold_signatures.pdf.

Gennaro et al., "Threshold-Optimal DSA/ECDSA Signatures and an Application to Bitcoin Wallet Security," International Conference on Applied Cryptography and Network Security, Jun. 19, 2016, 42 Pages.

Extended Search Report from corresponding European Application No. 19203273.8, Mar. 16, 2020.

International Preliminary Report on Patentability from PCT Application No. PCT/EP2020/077977, Sep. 2, 2021.

International Search Report and Written Opinion from PCT Application No. PCT/EP2020/077977, Dec. 3, 2020.

Office Action from corresponding Chinese Application No. 202080068768.6, Jun. 15, 2023.

* cited by examiner

DIGITAL SIGNATURE GENERATION USING A COLD WALLET

FIELD OF THE INVENTION

The present invention relates to a method and a system for generating a digital signature, using a cold wallet holding a private signature key.

BACKGROUND OF THE INVENTION

Digital signatures are widely used for signing documents, performing transactions, etc., in a manner which ensures that the person signing the document or performing the transaction is in fact authorised to do so. This is, for instance, relevant when performing transactions relating to crypto currencies. If a malicious party gains access to a private signature key, the malicious party will be able to perform signatures and transactions in the name of the rightful owner of the private signature key, and such transactions may be irreversible. Such malicious access to a private signature key may therefore cause unrepairable damage, and it is therefore imperative that private signature keys are stored under secure conditions.

When providing digital signatures a private signature key which proves the identity of the signor is normally required. Such private signature keys may be stored locally, for instance on a private PC belonging to the user or another piece of dedicated hardware, such as a portable memory storage or a dongle. As an alternative, a hardware security module (HSM) may be applied for storing signature keys. This has the disadvantage that signatures can only be generated from the PC or the dedicated hardware. Furthermore, the security of the system is limited by the behaviour of the user, including how careful the user is with respect to preventing theft or unauthorised access to the hardware where the private signature key is stored.

Another possibility is to store private signature keys at a trusted key management service. This allows a user to access the private signature key without necessarily having access to specific hardware. Furthermore, the security of the system is handled centrally, by the trusted key management service, and it is therefore less sensitive to the behaviour of the individual user. However, the security of the system needs to be balanced between allowing easy access for the rightful users, while preventing malicious parties from gaining access to the signature keys.

In order to provide a high level of security, so-called 'cold wallets' may be applied. Cold wallets are systems for storing and controlling private signature keys, which are not connected to a communication network, such as the Internet. This is sometimes referred to as an 'air-gapped' system. Since access from a communication network is considered as one of the major attack vectors on a key management system, cold wallets exhibit a very high security level. However, the lack of communication network accessibility also makes it difficult for a rightful user to gain access to his or her private signature key. Furthermore, the cold wallet still represents a single point of failure in the sense that if a malicious party succeeds in compromising the hardware holding the cold wallet, he or she will have full access to the private signature key. This is even true if the private signature key is secret shared and stored in different locations, because it is still necessary to assemble the private signature key in order to generate a signature. Finally, in order to perform a signature, some data needs to enter the air-gapped system, thereby introducing a risk that malware enters the air-gapped system and compromises the private signature key.

Steven Goldfeder, et al., "Securing Bitcoin wallets via threshold signatures", 3 Jun. 2014, available at https://www.cs.princeton.edu/~stevenag/bitcoin_threshold_signatures.pdf, discloses a threshold signature scheme which is compatible with Bitcoin's ECDSA signatures, and which can be used to enforce complex yet useful security policies including shared control of a wallet, secure bookkeeping, secure delegation of authority, and two-factor security for personal wallets. The ability to construct a valid signature is distributed among n players, each of whom receives a share of a private signing key, e.g. by means of a secret sharing scheme. The participation of t or more of them is required to sign, for some fixed t≤n. The key shares may be stored in a cold wallet. An ECDSA threshold signature protocol is used for providing a signed transaction with parallel control without reconstructing the private signing key. The signature is obtained directly from the key shares in a step which requires communication among the players holding the key shares.

DESCRIPTION OF THE INVENTION

It is an object of embodiments of the invention to provide a method for providing a digital signature, in which a high level of security is obtained while allowing easy access for rightful users.

It is a further object of embodiments of the invention to provide a system for providing a digital signature, which offers a high level of security while allowing easy access for rightful users.

According to a first aspect the invention provides a method for providing a digital signature, the method comprising the steps of:

providing a private signature key being distributed among two or more nodes of a cold wallet, each node of the cold wallet thereby being in the possession of one or more shares of the private signature key, and none of the nodes of the cold wallet being in the possession of all shares of the private signature key, each node of the cold wallet generating a pre-signature, based on its share(s) of the private signature key, and transmitting the pre-signature to one of two or more pre-signature nodes, in such a manner that each pre-signature node receives a pre-signature from only one of the nodes of the cold wallet, a signing application requesting a signature and transmitting a message to be signed to each of the pre-signature nodes, in response to receiving the request for a signature and the message to be signed, each pre-signature node generating a partial signature, based on its pre-signature and on the message to be signed, each pre-signature node transmitting its partial signature to the signing application, and the signing application computing a digital signature from the partial signatures.

Thus, the method according to the first aspect of the invention is a method for providing a digital signature. As described above, such digital signatures may be used for signing documents or performing transactions, such as crypto currency transactions, e.g. based on blockchain technology.

Initially, a private signature key is provided. The private signature key may be provided once and for all when the system is set up, and the private signature key may subsequently be applied for several signatures, i.e. some or all of the steps described below may be repeated without repeating the step of providing a private signature key.

The private signature key is distributed among two or more nodes of a cold wallet. Accordingly, each of the nodes of the cold wallet is in the possession of at least one share of the private signature key, and none of the nodes of the cold wallet is in the possession of all of the shares of the private signature key, and thereby none of the nodes constitutes a single point of failure. Furthermore, since the nodes form part of a cold wallet, they are not connected to a communication network and thereby form an air-gapped system, and accordingly the private signature key is stored under very secure conditions. It is not ruled out that the nodes are allowed to communicate with each other under certain circumstances, and for a limited period of time, e.g. in order to generate the private signature key. However, none of the nodes are allowed to receive communication from outside the cold wallet.

The shares of the private signature key may act as multiple private keys of a multi-signature set-up, in which multiple valid signatures based on multiple separate private keys are required in order to provide a valid signature or to validly authorize a transaction. Thereby the method according to the invention may be applied for emulating a multi-signature workflow. For instance, the nodes of the cold wallet may be arranged on separate servers, which may even be physically separated from each other.

It is not ruled out that the private signature key is in the form of a root key and a plurality of deterministically derived hierarchical keys, which have been derived from the root key. This could, e.g., be the case if the cold wallet is in the form of a so-called HD wallet which is sometimes applied in relation to bitcoins of other crypto currencies. In this case, a plurality of hierarchical keys may be derived, e.g. when the root key is generated and the nodes therefore need to communicate with each other, and each node may hold one or more shares of the root key and a plurality of derived key shares. The key shares may each be provided with an index number. The hierarchical key shares may, e.g., be derived by calculating a hash, e.g. a HMAC, from the root key. In this scenario, the root key is maintained in the cold wallet. However, some of the layers of derived keys may be allowed to leave the cold wallet, thereby making them more accessible without compromising the security of the root key.

Next, each node of the cold wallet generates a pre-signature, based on its share(s) of the private signature key. Since each pre-signature is generated based on only some of the shares of the private signature key, none of the pre-signatures represents the entire private signature key. The pre-signatures may therefore be regarded as pre-signature shares, each node of the cold wallet thereby holding a pre-signature share. In the case that the private signature key is of a kind comprising a root key and a plurality of deterministically derived hierarchical keys, each node of the cold wallet may generate the pre-signature based on one of the derived key shares.

The generation of the pre-signatures may be performed with or without internal communication among the nodes of the cold wallet. In the case that the generation of the pre-signatures requires internal communication among the nodes of the cold wallet the pre-signature may advantageously be generated at a specified time, e.g. immediately following the step of providing the private signature key, which also requires communication among the nodes of the cold wallet. Thereby communication among the nodes of the cold wallet is minimised and limited to well defined time intervals, thereby minimising the risk of leaking shares of the private signature key.

In the case that the method of the invention is applied for emulating a multi-signature workflow, all of the nodes holding shares of the private signature key need not form part of a cold wallet, in the sense that at least some of the nodes may be allowed to communicate outside a closed or air-gapped environment.

Furthermore, each node of the cold wallet transmits the generated pre-signature to one of two or more pre-signature nodes, in such a manner that each pre-signature node receives a pre-signature from only one of the nodes of the cold wallet. Accordingly, there is a one-to-one relationship between the nodes of the cold wallet and the pre-signature nodes, and none of the pre-signature nodes is in the possession of pre-signatures which in combination are representative for the entire private signature key. As a consequence, none of the pre-signature nodes constitutes a single point of failure. Furthermore, the pre-signatures are exported from the cold wallet without entirely or partly revealing the private signature key. It is noted that the step of generating and transmitting the pre-signatures can be performed without knowledge of the message to be signed, and it is therefore not required to transmit the message to the cold wallet.

Next, a signing application requests a signature and transmits a message to be signed to each of the pre-signature nodes. In response thereto, each pre-signature node generates a partial signature, based on its pre-signature and on the message to be signed. Since the partial signatures are generated by the respective pre-signature nodes, and on the basis of the pre-signatures which the respective nodes are in the possession of, none of the partial signatures are representative for the entire private signature key, and thereby none of the partial signatures form a complete signature of the message. However, a complete signature can be formed from a combination of the partial signatures.

Thus, each of the pre-signature nodes transmits it partial signature to the signing application. Thereby the signing application is in the possession of all of the partial signatures, and is thereby able to form a complete signature. Accordingly, the signing application finally computes a digital signature from the partial signatures.

It is an advantage that the pre-signatures are generated within the cold wallet, in such a manner that no data enters the cold wallet and no shares of the private signature key leaves the cold wallet, because this drastically reduces the risk of leaking of any information regarding the private signature key.

Furthermore, since the pre-signatures are transmitted to the pre-signature nodes, outside the cold wallet, where they are easy to access for a user, the system is very user friendly and easy to use for authorized users.

Thus, in the method according to the first aspect of the invention, the cold wallet remains air-gapped during the entire process. Thereby the risk of introducing malware in the cold wallet, as well as the risk of leaking the private signature key, is minimised. However, since the pre-signatures are held by the pre-signature nodes, these are significantly more accessible during the actual signing process than the private signature key, thereby providing easy access to signatures for rightful users. Thus, the method according to the first aspect of the invention provides a high level of security, due to the shares of the private signature key being held by the nodes of the cold wallet, while allowing easy access for rightful user, due to the pre-signatures being held by the pre-signature nodes.

The method may further comprise the step of each of the pre-signature nodes deleting the pre-signature after the step of generating a partial signature and before the step of transmitting the partial signature. According to this embodiment, a pre-signature is deleted from the pre-signature node as soon as it has been applied for generating a partial signature. Thereby it is prevented that a given pre-signature can be applied for generating two or more partial signatures. This is an advantage, because such multiple partial signatures originating from one pre-signature may compromise the secrecy of the private signature key. By deleting the pre-signature before the partial signature is transmitted to the signing application it is further prevented that a malicious party who has gained access to the signing application requests a second partial signature based on the same pre-signature. This is particularly relevant when an elliptic curve digital signature algorithm (ECDSA) is applied.

The step of each node of the cold wallet transmitting the pre-signature to one of the pre-signature nodes may be performed using a one-way communication channel. According to this embodiment it is efficiently ensured that information is only allowed to exit the cold wallet, and that no data is allowed to enter the cold wallet. Accordingly, the private signature key and the message to be signed will never be located at the same position. This considerably reduces the risk of malware entering the cold wallet, thereby compromising the private signature key, because such malware may enter the cold wallet along with the message.

The one-way communication channel could, e.g., be in the form of a visual output, such as a two-dimensional code, which can be scanned by the pre-signature nodes. Alternatively or additionally, the one-way communication channel could include network equipment and/or connections which allow only one-way communication.

The step of providing a private signature key may be performed by the nodes of the cold wallet generating the private signature key by means of a multi-party computation protocol. The multi-party computation protocol may, e.g., be a cryptographic protocol. According to this embodiment, the nodes of the cold wallet cooperate in generating the private signature key in such a manner that the entire private signature key is never assembled, and in such a manner that none of the shares of the private signature key leaves the cold wallet.

Each node of the cold wallet may generate the pre-signature as part of a batch comprising two or more pre-signatures. According to this embodiment, a plurality of pre-signatures are generated, e.g. initially upon generation of the private signature key, and the pre-signatures are used, one at a time, when signatures are requested. For instance, generation of a pre-signature may require communication among at least some of the nodes of the cold wallet. This could, e.g., include applying a multi-party computation protocol, similarly to the generation of the private signature key described above. In order to minimise the risk of compromising the private signature key, it may be desirable to limit communication among the nodes of the cold wallet to short and infrequent time intervals. If a number of pre-signatures are generated as a batch, the nodes of the cold wallet need not communicate with each other the next time a pre-signature is required. Thereby the security of the system is improved.

The pre-signatures may further be transmitted to the respective pre-signature nodes as batches of pre-signatures.

As an alternative, the batches of pre-signatures may be stored at the respective nodes of the cold wallet, and the pre-signatures may be transmitted to the respective pre-signature nodes one at a time each time a signature is requested.

At least the steps of providing a private signature key, generating pre-signatures and transmitting the pre-signatures to the pre-signature nodes may be performed as pre-processing steps prior to the step of the signing application requesting a signature.

The steps of providing a private signature key, generating pre-signatures and transmitting the pre-signatures to the pre-signature nodes can be performed without any knowledge of the message to be signed. Therefore, these steps may advantageously be performed as pre-processing steps, before the signature is requested, and possibly at a time where the load on the system is low. This reduces the latency of the system when the signature is actually requested. Furthermore, the reliability of the system is improved, since communication between the nodes of the cold wallet and the pre-signature nodes is not required at the time where the signature is requested and generated, thereby reducing the risk of communication failure during the signing process. Finally, this ensures that the cold wallet remains air-gapped during the actual signing process, thereby considerably reducing the risk of a successful malicious attack on the system.

As an alternative, the step of each node of the cold wallet generating a pre-signature, based on its share(s) of the private signature key, and transmitting the pre-signature to one of two or more pre-signature nodes may be initiated by the pre-signature nodes in response to receipt of a request for a signature from the signing application. According to this embodiment, the pre-signatures are not generated until a signature is actually requested. Instead, the process is started by the signing application requesting a signature and transmitting a message to be signed to the pre-signature nodes. In response thereto, the pre-signature nodes request pre-signatures from the respective nodes of the cold wallet, which in turn generate the pre-signatures and transmit them to the pre-signature nodes.

The step of each pre-signature node generating a partial signature may be performed without internal communication among the pre-signature nodes. According to this embodiment, once the pre-signature nodes have received the respective pre-signatures from the nodes of the cold wallet, each pre-signature node is able to generate its partial signature without communicating with any of the other pre-signature nodes. This minimises the required communication when the actual signature is being generated, thereby reducing latency and increasing safety and reliability of the system. This embodiment is particularly relevant in combination with an embodiment in which some of the method steps are performed as pre-processing steps, as described above.

The method may further comprise the step of authorizing the request for a signature from the signing application. According to this embodiment, the signing process will only be initiated if it can be verified that the request for a signature originates from an authorized user. The authorization may, e.g., include entering of a password or any other suitable identification method.

The nodes of the cold wallet may fulfil a threshold condition, t, and the pre-signature nodes may fulfil a threshold condition, t', where t'≥t.

Systems for performing multi-party digital signatures are often designed as fulfilling (t,n), where n is the number of nodes and t is the threshold. The threshold, t, designates how many malicious parties or non-participating parties can be tolerated, while allowing the signing process to be completed. Typically, a valid signature can be generated by any t+1 honest nodes.

For instance, in the case that t=n/2, and n=3, a valid signature can be generated by any 2 nodes, and up to 1 malicious or non-participating node is tolerated.

According to this embodiment, the nodes of the cold wallet fulfil a threshold condition, t. Thus, any t+1 nodes of the cold wallet can compute the private signature key. Furthermore, the pre-signature nodes fulfil a threshold condition, t'. Thus, a valid signature can be computed from pre-signatures originating from any t'+1 of the pre-signature nodes. Since t' A, the number of required participating and honest pre-signature nodes is at least as large as the number of required honest and participating nodes of the cold wallet. According to one embodiment t'=2t. Thus, the lower security level of the pre-signature nodes, caused by the higher accessibility as compared to the cold wallet, is compensated by imposing a stricter threshold condition.

The method may further comprise the steps of:
  at least some of the nodes of the cold wallet generating one or more additional pre-signature shares, encrypting the additional pre-signature share(s), and transmitting the encrypted additional pre-signature share(s) to one or more of the pre-signature nodes along with the pre-signatures, and
  each pre-signature node which has received and encrypted additional pre-signature share transmitting the encrypted additional pre-signature share to the signing application along with the partial signature,
and the step of the signing application computing a digital signature may comprise the steps of:
  the signing application decrypting the received encrypted additional pre-signature share(s),
  the signing application generating an additional pre-signature, based on the decrypted additional pre-signature share(s), and generating an additional partial signature based on the additional pre-signature and on the message to be signed, and
  the signing application computing the digital signature from the partial signatures received from the pre-signature nodes and the generated additional partial signature.

According to this embodiment, the signing application acts as an additional party in the signing process, along with the pre-signature nodes. Thus, instead of n partial signatures, originating from n pre-signature nodes, there are now n+1 partial signatures, and the $(n+1)^{th}$ partial signature is generated by the signing application using the one or more additional pre-signature shares provided by the n pre-signature nodes.

By introducing such an additional party to the signing process, the security of the part of the process which takes place outside the cold wallet is improved. For instance, the part of the signing process which takes place within the cold wallet may fulfil a (t,n) threshold condition, whereas the part of the signing process which takes place outside the cold wallet, e.g. at the pre-signature nodes and at the signing application, may fulfil a (t+1,n+1) threshold condition.

Furthermore, it is an advantage that the signing application is only involved in the final part of the signing process, because this minimises the number of required interactions between the signing application and the other parties of the system, thereby minimising latency during the signing process.

According to this embodiment, the signing process may be performed in the following manner. When the nodes of the cold wallet generate their pre-signatures, they also among them generate one or more additional pre-signature shares, which in combination form an additional pre-signature. The additional pre-signature share(s) is/are encrypted, and the encrypted additional pre-signature share(s) is/are transmitted to the respective pre-signature nodes along with the pre-signatures. The additional pre-signature share(s) may be generated by the respective nodes of the cold wallet, independently of the other nodes of the cold wallet, or two or more of the nodes of the cold wallet may cooperated in generating the additional pre-signature share(s). This will be described in further detail below.

In response to receiving a request for a signature, each pre-signature node generates partial signatures and transmits the partial signature to the signing application, as described above. The pre-signature nodes which have received an encrypted additional pre-signature shares from one of the nodes of the cold wallet further transmits the received encrypted pre-signature share to the signing application, along with its pre-signature. Thus, the signing application receives partial signatures and one or more encrypted additional pre-signature shares from the pre-signature nodes.

The signing application then decrypts the received encrypted additional pre-signature share(s) and generates an additional pre-signature from the decrypted shares. The signing application then generates an additional partial signature, based on the additional pre-signature and the message to be signed, in a manner which is similar to the manner in which the pre-signature nodes generated their partial signatures. Finally, the signing application computes the digital signature from the partial signatures received from pre-signature nodes and the additional partial signature. Thus, the signing application participates in the signing process as an additional party, acting similarly to the pre-signature nodes.

The step of generating one or more additional pre-signature shares may be performed by each of the nodes of the cold wallet generating an additional pre-signature share and encrypting the additional pre-signature share.

According to this embodiment, the pre-signature shares are generated by the respective nodes of the cold wallet, independently of the other nodes of the cold wallet. Thereby none of the nodes of the cold wallet gains any knowledge of the additional pre-signature shares generated by the other nodes of the cold wallet. Similarly, none of the pre-signature nodes gains any knowledge of the encrypted additional pre-signature shares received by the other pre-signature nodes.

According to this embodiment, the signing process could, e.g., be performed in the following manner. Assume that the cold wallet comprises n nodes, and that each node of the cold wallet holds a share, $x_i$, of the private signature key, [x], and a share, $k_i$, of a random shared value, [k], e.g. in a standard Schnorr signature scheme. The public verification key is then $y=g^x$, where g is a generator for a cyclic group. A signature of a message, m, is then (r,s), where r=H(m∥R) and s=k+rx, where $R=g^k$ and H is a function specified by the applied signature algorithm. It can further be assumed that each node of the cold wallet holds $y=g^x$, $R=g^k$, and an encryption key, e.g. a symmetric encryption key, $d_i$.

Each node of the cold wallet may then pick random numbers, $a_i$ and $b_i$, and compute $k'_i=k_i-a_i$ and $x'_i=x_i-b_i$. Furthermore, each node of the cold wallet may compute $D_i=E_{di}(a_i\|b_i\|R\|y)$, where E denotes authenticated encryption using the encryption key, $d_i$. The message transmitted from a given node of the cold wallet to the corresponding pre-signature node is then $M_i=(k'_i, x'_i, R, D_i)$, where $k'_i$, $x'_i$ and $R$ form a pre-signature and $D_i$ forms an encrypted additional pre-signature share.

The signing application requests a signature and transmits the message, m, to be signed to each of the pre-signature nodes. In response thereto, each pre-signature node generates a partial signature based on the message, $M_i$, received from the node of the cold wallet and the message, m, to be signed, as $partial_i=k'_i+H(m\|R)\cdot x'_i$. Each pre-signature node transmits a message $N_i=(partial_i, D_i)$ to the signing application.

The signing application holds decryption keys enabling it to decrypt each of the encrypted additional pre-signature shares, $D_i$. In the case that symmetric encryption is applied, the decryption keys are identical to the encryption keys, $d_i$. Thus, upon receipt of the messages, $N_i$, the signing application decrypts the encrypted additional pre-signature shares, $D_i$, and generates an additional pre-signature by computing $k'_{n+1}=a_1+a_2+\ldots+a_n$ and $x'_{n+1}=b_1+b_2+\ldots+b_n$. The signing application further generates an additional partial signature as $partial_{n+1}=k'_{n+1}+H(m\|R)\cdot x'_{n+1}$, i.e. in the same manner as the pre-signature nodes generated their respective partial signatures.

Finally, the signing application computes the digital signature, $(r,s)$, where $r=H(m\|R)$, and s is the sum of the partial signatures, i.e. $s=partial_1+partial_2+\ldots+partial_{n+1}$. Furthermore, the signing application may check that all received values of R are identical. If this is not the case, then the signature is incorrect, e.g. due to a malicious or dishonest party. As a consequence, the signing application may choose to abort the signing process if the received values of R are not identical.

As an alternative, the step of generating one or more additional pre-signature shares may be performed in a manner similar to the embodiment described above, but with only some of the nodes of the cold wallet participating. In this case, less than n additional pre-signature shares are required in order to generate the $(n+1)^{th}$ pre-signature.

As another alternative, the step of generating one or more additional pre-signature shares may be performed by at least two of the nodes of the cold wallet applying a multi-party computation protocol.

According to this embodiment, the one or more additional pre-signature shares is/are generated by two or more of the nodes of the cold wallet in cooperation. All of the nodes of the cold wallet may participate in this process, or only some of the nodes of the cold wallet may participate.

For instance, the nodes of the cold wallet may, by means of the multi-party computation protocol, generate two or more additional pre-signature shares and distribute these among two or more of the nodes of the cold wallet. This could, e.g., be similar to the generation of the distributed private signature key by means of a multi-party computation protocol which is described above. The encryption of the additional pre-signature share(s) may, e.g., be an integrated part of the multi-party computation protocol in the sense that the distributed shares may be regarded as encrypted shares.

As an alternative, the multi-party computation protocol may result in the generation of a single encrypted additional pre-signature share, which constitutes an encrypted version of the entire additional pre-signature. This encrypted additional pre-signature share may then be transmitted to one or more of pre-signature nodes by one or more of the nodes of the cold wallet. In this case, once the signing application has decrypted the additional pre-signature share, the additional pre-signature share has also been generated.

As described above, the additional pre-signature shares may be encrypted and decrypted by means of symmetric encryption keys shared between the respective nodes of the cold wallet and the signing application. In this case each of the nodes of the cold wallet shares a symmetric encryption key with the signing application, and this key is applied for encrypting the additional pre-signature share as well as for decrypting the additional pre-signature share. As an alternative, another encryption scheme may be applied, e.g. applying asymmetric encryption keys, such as a public key infrastructure (PKI) scheme.

According to a second aspect the invention provides a system for providing a digital signature, the system comprising:

a cold wallet comprising two or more nodes having a private signature key distributed among the nodes, each node of the cold wallet thereby being in the possession of one or more shares of the private signature key, and none of the nodes of the cold wallet being in the possession of all shares of the private signature key, the nodes of the cold wallet being configured to generate a pre-signature, based on its share(s) of the private signature key, and to transmit the pre-signature to a pre-signature node, a pre-signature wallet comprising two or more pre-signature nodes, the pre-signature nodes being configured to receive pre-signatures from the nodes of the cold wallet in such a manner that each pre-signature node receives a pre-signature from only one of the nodes of the cold wallet, to generate a partial signature, based on its pre-signature and a message to be signed, and to transmit its partial signature to a signing application, and a signing application configured to transmit a request for a signature and a message to be signed to the pre-signature nodes, to receive partial signatures from the pre-signature nodes, and to compute a digital signature from the partial signatures.

The system according to the second aspect of the invention may be used for performing the method according to the first aspect of the invention, and the remarks set forth above are therefore equally applicable here.

Thus, the system according to the second aspect of the invention comprises a cold wallet, a pre-signature wallet and a signing application.

The cold wallet comprises two or more nodes having a private signature key distributed among them in the manner described above with reference to the first aspect of the invention. The nodes of the cold wallet are further configured to generate pre-signatures and to transmit these to the pre-signature nodes in the manner described above with reference to the first aspect of the invention. The cold wallet is air-gapped, i.e. the nodes of the cold wallet are offline, except when the private signature key is generated, where the nodes are allowed to communicate with each other only, and when pre-signatures are output, in which case the nodes are allowed to transmit information, but not to receive information.

The pre-signature wallet comprises two or more pre-signature nodes, each being configured to receive pre-signatures in the manner described above with reference to the first aspect of the invention. The pre-signature nodes are further configured to generate partial signatures and transmit these to the signing application in the manner described above with reference to the first aspect of the invention.

The signing application is configured to transmit a request for a signature and a message to be signed to the pre-signature nodes, to receive the partial signatures from the pre-signature nodes, and to compute the digital signature, in the manner described above with reference to the first aspect of the invention.

Data transmission to the cold wallet may be prevented. In this case data is only allowed to leave the cold wallet, in the form of the pre-signatures which are transmitted to the pre-signature nodes. However, the message to be signed never enters the cold wallet, and the shares of the private signature key never leave the cold wallet. Thereby it is efficiently ensured that the private signature key and the message to be signed are never located at the same position.

BRIEF DESCRIPTION OF THE DRAWINGS

The invention will now be described in further detail with reference to the accompanying drawing in which.

DETAILED DESCRIPTION OF THE DRAWINGS

Figure 1:
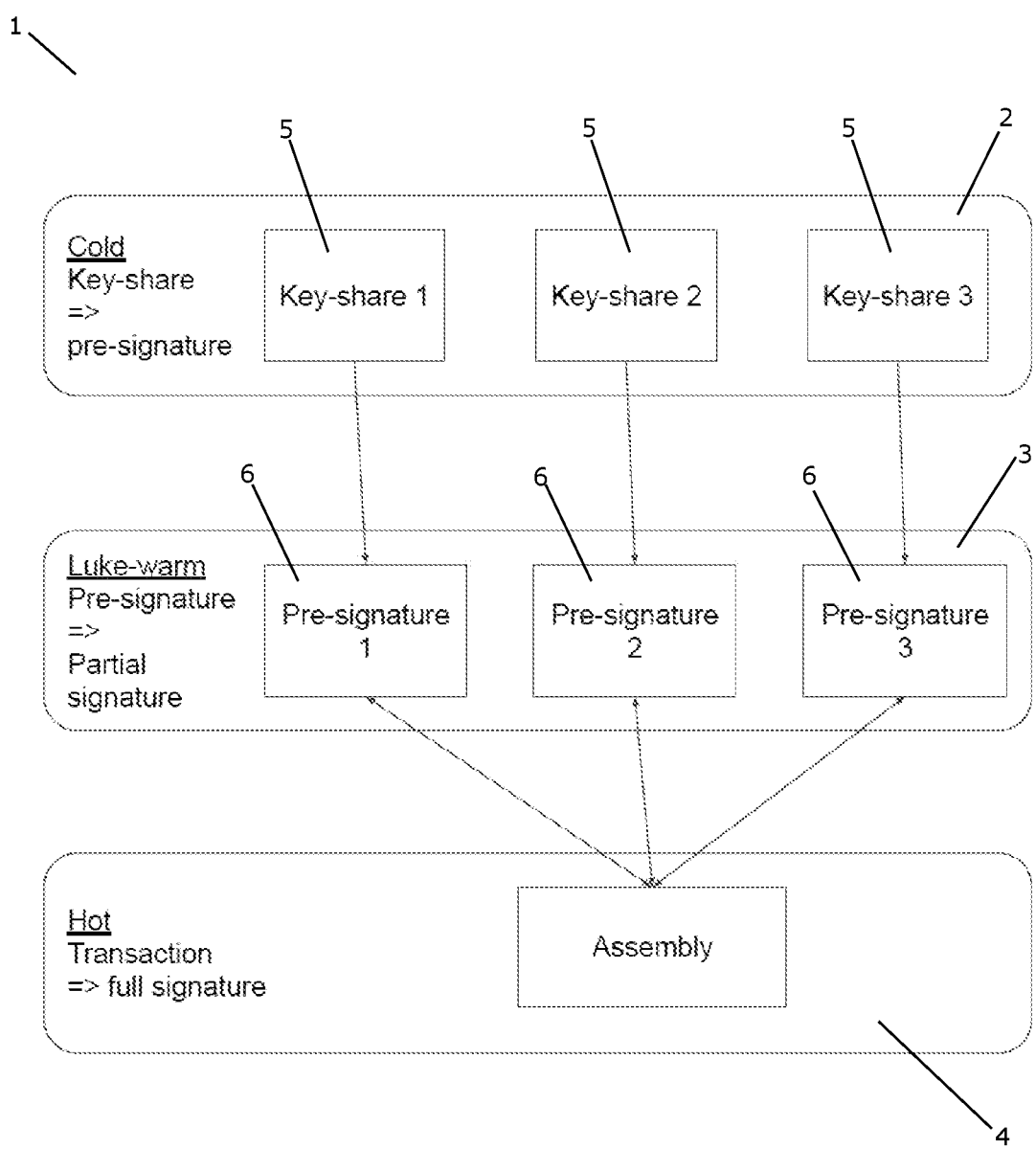
FIG. 1 is a diagrammatic view of a system according to an embodiment of the invention.

FIG. 1 is a diagrammatic view of a system 1 according to an embodiment of the invention. The system 1 comprises a cold wallet 2, a pre-signature wallet 3 and a signature application 4.

The cold wallet 2 comprises a number of nodes 5. For illustrative purposes, three nodes 5 are shown. It should, however, be noted that it is not ruled out that the cold wallet 2 comprises two nodes 5, or that the cold wallet 2 comprises four or more nodes 5. The cold wallet 2 is air-gapped in the sense that the nodes 5 of the cold wallet 2 are essentially offline, and thereby difficult to gain access to by a malicious party.

The pre-signature wallet 3 comprises a number of pre-signature nodes 6. For illustrative purposes, three pre-signature nodes 6 are shown, but it is not ruled out that the pre-signature wallet 3 could comprise two pre-signature nodes 6, or that the pre-signature wallet 3 could comprise four or more pre-signature nodes 6. However, it is preferred that the number of nodes 5 of the cold wallet 2 and the number of pre-signature nodes 6 are identical. The pre-signature wallet 3 may be considered as 'lukewarm' in the sense that limited communication to and from the pre-signature wallet 3 is allowed. Thereby the security level of the pre-signature wallet 3 is lower than the security level of the cold wallet 2. However, the pre-signature wallet 3 is easier accessible for authorized users, and is therefore more user friendly than the cold wallet 2.

The system 1 of FIG. 1 may operate in the following manner. Initially, a private signature key is generated by the nodes 5 of the cold wallet 2, using a multi-party cryptographic protocol. Thereby the private signature key is distributed among the nodes 5 of the cold wallet 2 in such a manner that each node 5 possesses one or more shares of the private signature key, and none of the nodes 5 is in the possession of all of the shares of the private signature key. Accordingly, the private signature key is never assembled at one position, and none of the nodes 5 constitutes a single point of failure with respect to the private signature key. In the embodiment illustrated in FIG. 1, there are three shares of the private signature key, and each of the nodes 5 is in the possession of one of the shares. The nodes 5 of the cold wallet 2 are allowed to communicate with each other while they generate the private signature key, but are otherwise isolated from each other. Thereby it is prevented that the private signature key is assembled at a later point in time. The nodes 5 of the cold wallet 2 are prevented from receiving data from any entity outside the cold wallet 2 at any time.

The shares of the private signature keys may act as separate private keys of a multiple private key of a multi-signature set-up, thereby allowing the system 1 to emulate a multi-signature workflow, as described above.

Next, each of the nodes 5 of the cold wallet 2 generates a pre-signature, based on its share of the private signature key. The pre-signature generated by a given node 5 of the cold wallet 2 is thereby representative for the share of the private signature key, which is held by that node 5, but not for the shares of the private signature key which are held by the other two nodes 5 of the cold wallet 2. The pre-signatures may be generated as part of a batch of pre-signatures, or they may be generated one at a time. The nodes 5 of the cold wallet 2 may be allowed to communicate with each other during generation of the pre-signatures.

Each node 5 of the cold wallet 2 further transmits the pre-signature to a corresponding pre-signature node 6. Thus, each pre-signature node 6 receives a pre-signature from one, and only one, of the nodes 5 of the cold wallet 2. Accordingly, none of the pre-signature nodes 6 receives pre-signatures being representative for the entire private signature key, and thereby none of the pre-signature nodes 6 will be able to compute a valid signature on its own. However, the pre-signature nodes 6 in combination are in the possession of pre-signatures which enable them to compute a valid signature. The transmission of the pre-signatures from the nodes 5 of the cold wallet 2 to the pre-signature nodes 6 is performed using a one-way communication channel. For instance, the nodes 5 of the cold wallet 2 may generate a visual or machine readable code, such as a two-dimensional bar code, which can be read by the relevant pre-signature node 6, e.g. by means of a camera or a suitable scanner. Thereby it is efficiently ensured that no data enters the cold wallet 2.

The steps described so far require no knowledge of the message to be signed, and they may therefore be performed as pre-processing steps. This reduces the number of steps, in particular the number of communication steps, required at the time where the signature is actually generated. This reduces the latency of the system 1 and reduces the risk of failure of the signing process due to communication faults or timeouts.

When a signature is required, an authorized user contacts the signature application 4 and provides the message to be signed. The signature application 4 then contacts the pre-signature nodes 6 by requesting a signature and transmitting the message to be signed to each of the signature nodes 6. In response thereto, each of the pre-signature nodes 6 generates a partial signature, based on its pre-signature, and based on the message which was received from the signature application 4. Thus, none of the partial signatures constitutes an entire valid signature, but the three partial signatures, in combination, contain sufficient information to compute a valid signature of the message. Furthermore, the partial signatures are generated, based on the message to be signed, as well as based on the private signature key, in the form of the pre-signatures being generated based on the respective shares of the private signature key. However, the partial signatures are generated without requiring that the message to be signed enters the cold wallet 2, and without requiring that any of the shares of the private signature key leaves the cold wallet 2. Furthermore, the partial signatures may be generated without requiring that the pre-signature nodes 6 communicate with each other. As described above, this reduces the latency of the system 1 and minimises the risk of the system 1 being compromised. In the case that the system 1 is applied for emulating a multi-signature workflow, this further allows the signature process to be performed in a manner which resembles a standard multi-signature workflow very closely, i.e. the workflow which the users are used to follow need not be changed. For instance, it is not required that all parties are online or generate the partial signatures simultaneously.

The pre-signature nodes 6 further transmit the generated partial signatures to the signing application 4, and the signing application 4 then computes the digital signature of the message from the partial signatures. As described above, the system 1 illustrated in FIG. 1 provides a high level of security while allowing easy access for rightful users, due to the separation of the cold wallet 2 and the pre-signature wallet 3.

Figure 2:
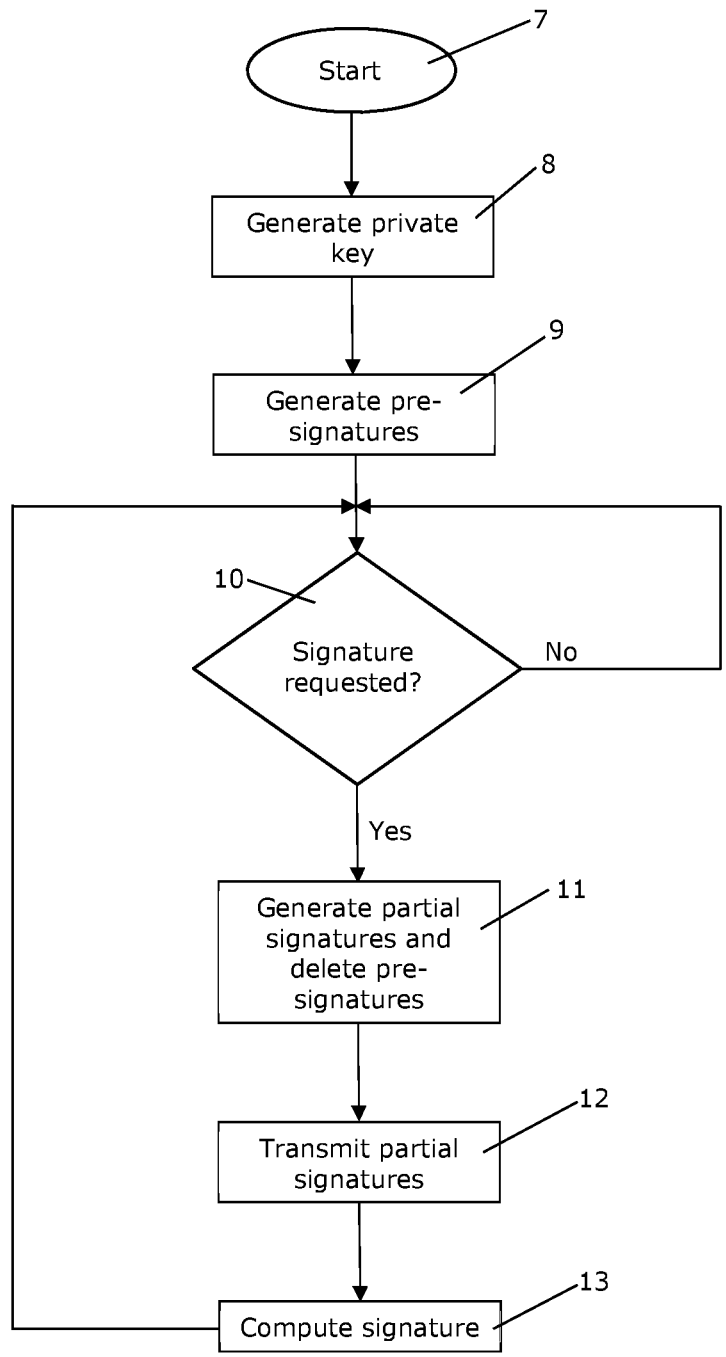
FIG. 2 is a flow chart illustrating a method according to an embodiment of the invention.

FIG. 2 is a flow chart illustrating a method according to an embodiment of the invention. The process is started at step 7. At step 8, a private signature key is generated by two or more nodes of a cold wallet, using a multi-party cryptographic computation protocol, e.g. in the manner described above. Accordingly, the private signature key is distributed among the nodes of the cold wallet.

At step 9, each node of the cold wallet generates a pre-signature, based on its share of the private signature key, and transmits the pre-signature to a pre-signature node, in the manner described above.

At step 10 it is investigated whether or not a signature has been requested by a signing application. If this is not the case, nothing further is done, and it is repeatedly investigated at regular time intervals if a request for a signature has been received. When a signature is requested, and the message to be signed is transmitted to the pre-signature nodes by the signing application, the process is forwarded to step 11, where each pre-signature node generates a partial signature, based on its pre-signature and on the message to be signed. When the partial signatures have been generated, the pre-signatures are deleted by the respective pre-signature nodes, in order to ensure that they are not reused for another future signature.

At step 12, each of the pre-signature nodes transmits its partial signature to the signing application which requested the signature. Finally, the signing application computes the signature from the received partial signatures, at step 13.

The invention claimed is:

1. A method for providing a digital signature, the method comprising the steps of:
receiving by two or more nodes of a cold wallet, one or more shares of a private signature key, each node of the cold wallet thereby being in the possession of the one or more shares of the private signature key, and none of the nodes of the cold wallet being in the possession of all shares of the private signature key;
generating by each node of the cold wallet a pre-signature, based on its share(s) of the private signature key, and transmitting the pre-signature to one of two or more pre-signature nodes, in such a manner that each pre-signature node receives a pre-signature from only one of the nodes of the cold wallet;
requesting by a signing application a signature and transmitting a message to be signed to each of the pre-signature nodes;
in response to receiving the request for a signature and the message to be signed, generating by each pre-signature node a partial signature, based on its pre-signature and on the message to be signed;
transmitting by each pre-signature node its partial signature to the signing application; and
in response to receiving the partial signatures from each pre-signature node, computing by the signing application a digital signature from the received partial signatures;
wherein the step of each node of the cold wallet transmitting the pre-signature to one of the pre-signature nodes is performed using a one-way communication channel.

2. The method according to claim 1, further comprising the step of each of the pre-signature nodes deleting the pre-signature after the step of generating a partial signature and before the step of transmitting the partial signature.

3. The method according to claim 1, wherein the step of receiving a private signature key is performed by the nodes of the cold wallet generating the private signature key by means of a multi-party computation protocol.

4. The method according to claim 1, wherein each node of the cold wallet generates the pre-signature as part of a batch comprising two or more pre-signatures.

5. The method according to claim 1, wherein at least the steps of receiving a private signature key, generating pre-signatures and transmitting the pre-signatures to the pre-signature nodes are performed as pre-processing steps prior to the step of the signing application requesting a signature.

6. The method according to claim 1, wherein the step of each node of the cold wallet generating a pre-signature, based on its share(s) of the private signature key, and transmitting the pre-signature to one of two or more pre-signature nodes is initiated by the pre-signature nodes in response to receipt of a request for a signature from the signing application.

7. The method according to claim 1, wherein the step of each pre-signature node generating a partial signature is performed without internal communication among the pre-signature nodes.

8. The method according to claim 1, further comprising the step of authorizing the request for a signature from the signing application.

9. The method according to claim 1, wherein the nodes of the cold wallet fulfil a threshold condition, t, and the pre-signature nodes fulfil a threshold condition, t', where t'≥t.

10. The method according to claim 1, further comprising the steps of:
at least some of the nodes of the cold wallet generating one or more additional pre-signature shares, encrypting the additional pre-signature share(s), and transmitting the encrypted additional pre-signature share(s) to one or more of the pre-signature nodes along with the pre-signatures; and
each pre-signature node which has received an encrypted additional pre-signature share transmitting the encrypted additional pre-signature share to the signing application along with the partial signature;
wherein the step of the signing application computing a digital signature comprises the steps of:
the signing application decrypting the received encrypted additional pre-signature share(s);
the signing application generating an additional pre-signature, based on the decrypted additional pre-signature share(s), and generating an additional partial signature based on the additional pre-signature and on the message to be signed; and the signing application computing the digital signature from the partial signatures received from the pre-signature nodes and the generated additional partial signature.

11. The method according to claim 10, wherein the step of generating one or more additional pre-signature shares is performed by each of the nodes of the cold wallet generating an additional pre-signature share and encrypting the additional pre-signature share.

12. The method according to claim 10, wherein the step of generating one or more additional pre-signature shares is performed by at least two of the nodes of the cold wallet applying a multi-party computation protocol.

13. The method according to claim 10, wherein the additional pre-signature shares are encrypted and decrypted by means of symmetric encryption keys shared between the respective nodes of the cold wallet and the signing application.

14. The method according to claim 1, wherein the pre-signatures are generated within the cold wallet, in such a manner that no data enters the cold wallet and no shares of the private signature key leaves the cold wallet.

15. The method according to claim 1, wherein the cold wallet is air-gapped during the method.

16. The method according to claim 1, wherein the one-way communication channel comprises a visual output.

* * * * *

UNITED STATES PATENT AND TRADEMARK OFFICE
CERTIFICATE OF CORRECTION

| | | |
|---|---|---|
| PATENT NO. | : 12,423,684 B2 | Page 1 of 1 |
| APPLICATION NO. | : 17/764814 | |
| DATED | : September 23, 2025 | |
| INVENTOR(S) | : Jakob Illeborg Pagter et al. | |

It is certified that error appears in the above-identified patent and that said Letters Patent is hereby corrected as shown below:

In the Specification

Column 7, Line 15, change "t' A" to "t'$\geq$t".

Signed and Sealed this
Eighteenth Day of November, 2025

John A. Squires
*Director of the United States Patent and Trademark Office*